March 14, 1933.  R. N. EARLY  1,901,586

DYNAMO ELECTRIC MACHINE

Filed Dec. 4, 1930  9 Sheets-Sheet 5

INVENTOR
Robert N. Early
BY
Pennie, Davis, Marvin & Edmonds
HIS ATTORNEY

March 14, 1933.   R. N. EARLY   1,901,586
DYNAMO ELECTRIC MACHINE
Filed Dec. 4, 1930   9 Sheets-Sheet 6

March 14, 1933.  R. N. EARLY  1,901,586
DYNAMO ELECTRIC MACHINE
Filed Dec. 4, 1930  9 Sheets-Sheet 8

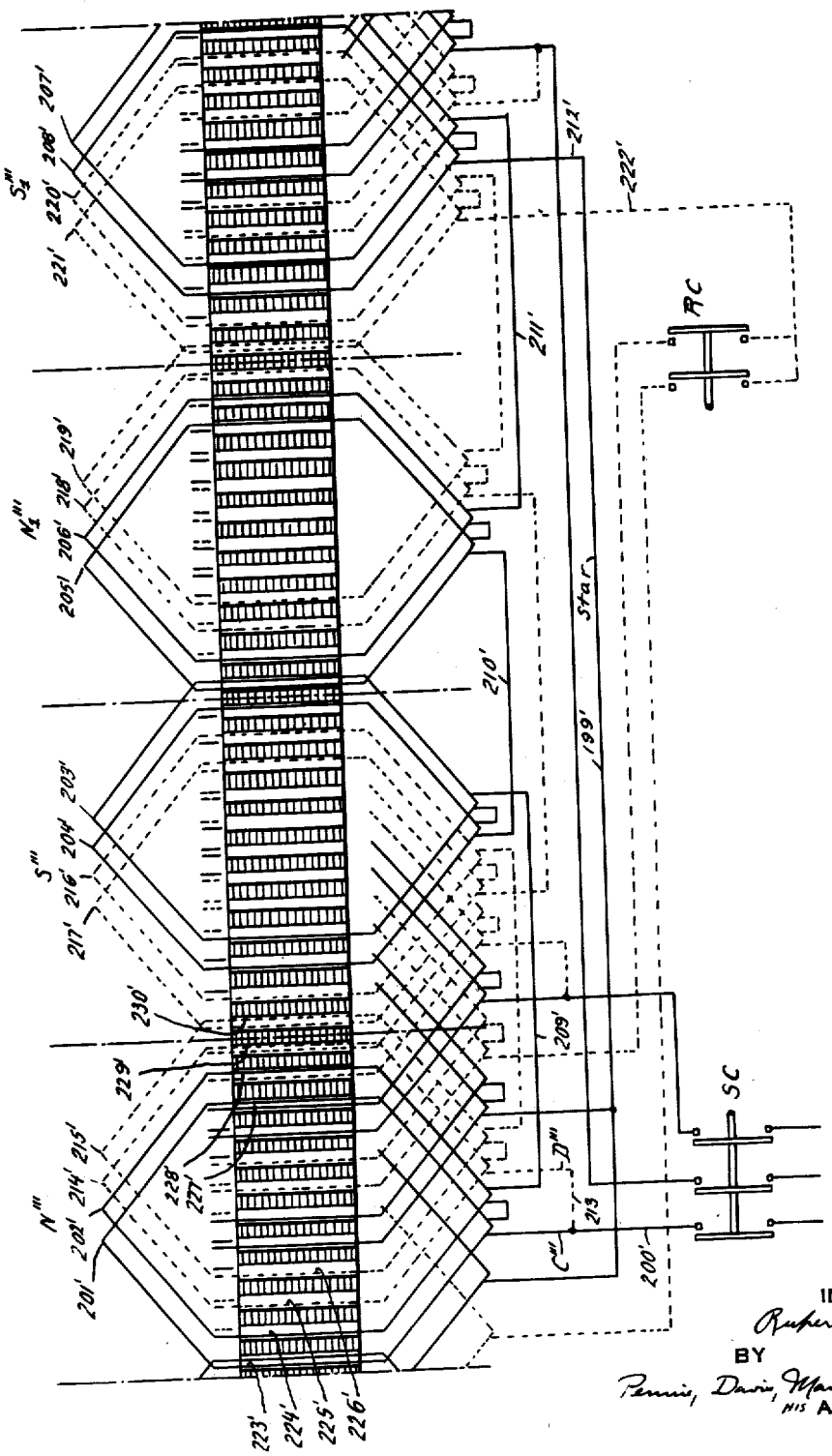

Patented Mar. 14, 1933

1,901,586

UNITED STATES PATENT OFFICE

RUPERT N. EARLY, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA

DYNAMO-ELECTRIC MACHINE

Application filed December 4, 1930. Serial No. 499,917.

This invention relates to electric motors, and more particularly concerns improvements in synchronous and induction motors and in means for starting motors of this type.

In the starting of alternating current motors of the synchronous or induction type, it is usually necessary or desirable to provide some means external to the motor for cutting down the voltage applied to the primary motor winding during the starting period. Thus, it has been customary to provide some means, such as an ordinary auto-transformer, for reducing the voltage applied to the motor terminals at least until the motor has accelerated to a considerable speed, and this for the reason that unless some such means is employed, the current drawn by the motor is excessive and may cause injury to the motor and an undesirable surge on the power line.

The present invention contemplates the provision of an improved motor embodying a primary winding organization such that the impedance of the active primary circuit may be materially increased during the starting period, thereby limiting the flow of current in the motor primary to a safe value at all times. More specifically, it is proposed in accordance with the present invention to provide a motor having two or more primary winding sections so disposed on the primary magnetic structure that the impedance of the primary circuit may be increased to an appreciable extent when one of the primary winding sections only is energized, and to further provide means for successively connecting separate winding sections of the line during the starting period.

The increase in the impedance of the primary winding which results when one section thereof is disconnected from the line, is in part due to the higher resistance of the remaining section but is more largely due to the increased reactance of the circuit when a portion thereof is disconnected. The resultant reactance of the primary circuit is always increased when a parallel section thereof is disconnected from the line, but since all sections of the primary winding have a common magnetic core, the amount of increase in reactance and consequent decrease in primary current caused by disconnecting one or more sections depends upon the distribution of the windings on the primary magnetic structure.

The amount by which the reactance of the primary circuit is increased when one or more parallel sections thereof are disconnected from the line depends largely upon the degree of magnetic coupling or mutual reactance of the several winding sections. Thus, if the primary winding sections are very closely coupled magnetically the increase in reactance obtained when one section is disconnected from the line is comparatively small, whereas a relative distribution of the winding sections which produces a looser magnetic coupling or less mutual reactance results in a greater increase in the reactance of the circuit when one section is disconnected. In different commercial installations, different degrees of increase in primary reactance during the starting period are desirable and this for the reason that the maximum amount of current which may be drawn by the primary winding without injury thereto and without producing undesirable line surges varies with the capacity of the motor, the current inrush thereof and various other factors. The motor and starting system of the present invention is designed to fulfill the requirements of installations in which a comparatively small increase in primary reactance during the starting period is desired.

In general, the objects of the invention are carried out by providing a motor having two or more winding sections comprising coils having corresponding coil sides or inductors respectively located in separate slots on the primary magnetic structure and by providing means for temporarily increasing the impedance of at least one of the sections, such as means for temporarily disconnecting such section from the line, during at least a portion of the starting period.

In accordance with the invention, the corresponding coil sides of the separate winding sections employed are preferably disposed in separate slots of the primary magnetic structure at all of the poles of the winding. Thus, in the case of a polyphase motor, the primary winding may comprise two or more separately energizable sections having corresponding coil sides respectively disposed in separate slots of each phase at each pole of the primary structure. In one embodiment of the invention, the corresponding coil sides of the separate winding sections occupy alternate slots in the primary magnetic structure and in another embodiment, the corresponding coil sides of the separate winding sections are respectively disposed in alternate groups of adjacent slots.

The term "corresponding coil sides" as employed herein refers to the coil sides on one side of each of the coils. Thus, for example, with the corresponding coil sides of the coils in the separate winding sections disposed in alternate slots, the left hand coil sides of the coils in one winding section will occupy every second slot and the left hand coil sides in the other winding section will occupy the intervening slots.

In each of the embodiments of the invention, suitable means are provided for temporarily increasing the impedance of at least one of the separate winding sections during at least a part of the starting period, and such means preferably comprises apparatus for temporarily disconnecting one or more of the winding sections from the line. The invention may be utilized by employing manually operable devices for temporarily changing the connections of the primary winding sections, but I prefer to provide automatic means for accomplishing this result, such as means responsive to the electrical condition of a secondary winding, or to the slip or speed of the motor.

The various objects and advantages of the invention will be best understood from a consideration of the following detailed description and the accompanying drawings, in which;

Fig. 9 is a view similar to Fig. 8 showing fractional pitch windings.

Figure 1:
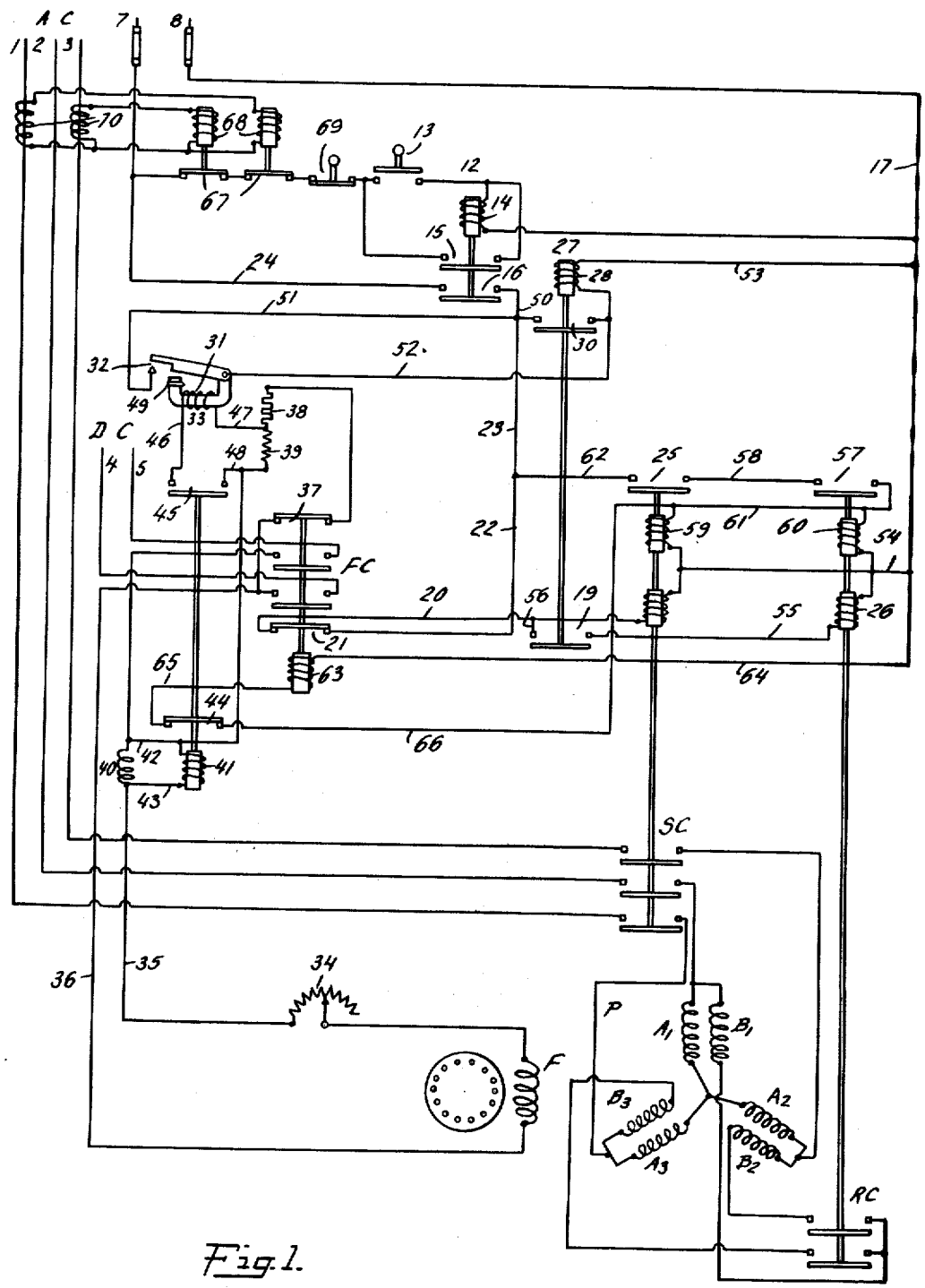
Figure 1 is a diagrammatic representation of an electric motor and a starting system therefor embodying the present invention.

In Fig. 1, I have illustrated a synchronous motor having a three-phase star-connected primary winding generally designated at P, a field winding F and a squirrel cage or damper winding S. The leads 1, 2 and 3 represent a source of three-phase alternating current and a source of direct current is represented by the leads 4 and 5 which may be connected to the field winding F.

The primary winding P comprises two three-phase winding sections A and B, the several phases of which are respectively designated $A_1$, $A_2$, $A_3$ and $B_1$, $B_2$, $B_3$. The winding section A has a neutral point 6. The outer terminals of the phases $B_1$, $B_2$ and $B_3$ comprising the winding section B are connected to the corresponding outer terminals of the phases $A_1$, $A_2$ and $A_3$ of the winding section A, and the inner terminals of the phases $B_1$, $B_2$ and $B_3$ may be connected to form a neutral point by closing the running contactor RC. The preferred arrangement of the primary winding sections relative to the primary magnetic structure of the motor will be hereinafter explained in detail.

The alternating current source 1, 2 and 3 may be connected to the outer terminals of the primary winding P by the starting contactor SC. It will be understood that the closing of the contactor SC connects the winding section A to the alternating current source and that the closing of the contactor RC serves to connect the winding section B to this same source. Furthermore, it will be clear that when both of the contactors SC and RC are closed, the two winding sections A and B are connected in parallel across the alternating current source.

In starting the motor of Fig. 1, the contactor SC is first closed to supply current to the winding section A and after the motor has attained a suitable speed, the contactor RC is closed to connect the other winding section B across the line. It will be noted that the winding section B is connected to the line without in any way interrupting the connection of the winding section A to the line. Accordingly, there is no interruption in the flow of current to the primary winding and no surge occurs on the line because of the interruption of the current, as is the case when a transfer from reduced voltage to full voltage is made in the heretofore customary manner involving the use of an autotransformer.

I have shown the contactor SC as being operated by a closing coil 10 which may be supplied with current from any suitable control circuit such as that represented by the wires 7 and 8. A pilot relay 12 and a starting push button 13 are included in the control circuit and it will be understood that upon closing the push button 13 the operating coil 14 of the pilot relay 12 is energized and the contacts 15 and 16 of this relay are closed. The closing of the contacts 15 completes a holding circuit for the coil 14 around the push button 13 and the closing of the contacts 16 serves to connect the operating coil 10 of the contactor SC across the control leads 7 and 8, this circuit being as follows; from wire 8 to wires 17 and 18, operating coil 10 of contactor SC, wires 19 and 20, contacts 21 of the field contactor FC, wires 22, 23 and 50, contacts 16 of the pilot relay 12 and wire 24 to wire 7. The closing of the contactor SC closes its auxiliary contacts 25.

As explained above, the closing of the contactor SC serves to supply current to the winding section A and the rotor of the motor commences to revolve. After the motor has attained say 80% of its normal operating speed (the particular value depending upon operating conditions) the running contactor RC may be closed to connect the remaining winding section B to the line.

The closing of the contactor RC may be accomplished by means of a closing coil 26 which may be supplied with current from the control circuit 7, 8. A control relay 27 may be employed for controlling the energization of the operating coil 26. The relay 27 has an operating coil 28 and contacts 29 and 30. Means are provided for delaying the operation of the control relay 27 and hence the closing of the contactor RC until the motor is in proper condition to have its inactive primary winding section connected across the line. I have represented such a means in the form of a relay 31 having contacts 32 and an operating coil 33 which may be connected in circuit with the secondary winding F of the motor. The winding F is connected to a field rheostat 34 and a field contactor FC by means of the wires 35 and 36. The field contactor FC is open during the starting period and auxiliary contacts 37 of this contactor serve to connect the field winding F in a closed circuit through the resistance elements 38 and 39 during the starting period. A reactance 40 is also connected in the field circuit and the operating coil 41 of a frequency relay FR is connected across the reactance 40 by means of wires 42 and 43. This frequency relay has normally closed contacts 44 and normally open contacts 45. The operating coil 33 of the relay 31 is connected across the resistance element 39 through the contacts 45 of the frequency relay by means of the wires 46, 47 and 48.

When voltage is first applied to the motor, an induced current of slip frequency is induced in the field circuit and a relatively large portion of this current flows through the coil 41 of the frequency relay FR due to the fact that this coil is connected across the reactance 40 which is in series with the field winding F. The frequency relay FR immediately operates to open its contacts 44 and close its contacts 45. The closing of the contacts 45 connects the relay coil 33 in parallel with the resistor 39. This resistor 39 has a relatively high resistance and, accordingly, a large part of the induced field current flows through the relay coil 33.

When the motor speed reaches a value such that it is appropriate to connect the winding section B of the primary winding P across the line, the frequency of the induced field current has reached such a low value that the relay 31 closes its contacts 32. A damper ring 49 on the core of this relay prevents the closing of the contacts 32 until the frequency of the current flowing through the relay coil 33 is reduced to a predetermined value corresponding with a motor speed such that the winding section B may be connected to the line without producing any undesirable line surge.

The operation of the relay 31 resulting in the closing of the contacts 32 thereof serves to supply current to the operating coil 28 of the control relay 27, the circuit including the wires 50 and 51 connecting the pilot relay contacts 16 and the contacts 32 of the relay 31, and the wires 52 and 53 connecting the control relay coil 28 with the contacts 32 of the relay 31 and the wires 17 and 8. When the control relay 27 operates, its contacts 29 and 30 are closed. The closing of the contacts 30 completes a holding circuit for the operating coil 28 around the contacts 32 of the relay 31 and the closing of the contacts 29 serves to connect the operating coil 26 of the running contactor RC to the control circuit. The circuit for energizing the operating coil 26 may be traced as follows; from the wire 8, wires 17 and 54, operating coil 26, wire 55, contacts 29 of the control relay 27, wire 56, wire 20, auxiliary contacts 21 of the field contactor FC, wires 22, 23 and 50, contacts 16 of the pilot relay 12 and wire 24 to wire 7. It will be noted that energy is supplied to the operating coil 26 of the running contactor RC through the closed contacts 16 of the pilot relay 12, and, accordingly, the contactor RC cannot be closed until the pilot relay is energized and current consequently supplied to the operating coil 10 of the starting contactor SC.

The closing of the running contactor RC causes the auxiliary contacts 57 associated therewith to close, and it will be noted that these contacts are connected in series with the auxiliary contacts 25 of the starting contactor SC by means of the wire 58. Thus, when both auxiliary contacts 25 and 57 are closed, current is supplied to the holding coils 59 and 60, the circuit being from the wire 8 through wires 17, 54 and 18, the holding coils 59 and 60, wire 61, contact 57, wire 58, contact 25, and wires 62, 23, 50 and 24 to wire 7.

When the motor reaches a speed near synchronous speed, the coil 41 of the frequency relay FR becomes deenergized whereupon the contacts 44 close and contacts 45 open. The closing of contacts 44 serves to supply current from the control circuit to the operating coil 63 of the field contactor FC. The circuit for this operating coil 63 is as follows; from wire 8, wires 17 and 64, operating coil 63, wire 65, contacts 44 of frequency relay FR, wires 66 and 61, auxiliary switch contacts 57, wire 58, auxiliary switch contacts 25, wires 62, 23 and 50, contacts 16 of the pilot relay 12 and wire 24 to wire 7.

The closing of the field contactor FC serves to supply excitation current to the field winding F from the source of direct current represented by the wires 4 and 5. The closing of the field contactor also serves to open the contacts 21 and 37 thereof. The opening of the contacts 37 disconnects the discharge resistance 38—39 from the field winding F, and the opening of the contacts 21 interrupts the flow of current from the wires 7 and 8 to the operating coils 10 and 26 of the contactors SC and RC, and it will be understood that thereafter these contactors are respectively held in their closed positions by the holding coils 59 and 60.

As pointed out above, the holding coils 59 and 60 are energized through the contacts 16 of the pilot relay 12. The operating coil 14 of this relay derives its current from the wires 7 and 8 through the contacts 67 of the overload relays 68 and the contacts of a push button switch 69. By opening the switch 69, the pilot relay 12 is deenergized and in turn, the holding coils 59 and 60 are deenergized to open the starting and running contactors SC and RC. Also, the operating coil 63 of the field contactor FC is deenergized and this contactor opens to disconnect the field winding F from the source of direct current 4—5. In a like manner, the motor is disconnected from the line and from the source of direct current whenever the overload relays 68 operate to open their contacts 67. The overload relays 68 are connected to current transformers 70 in the usual manner.

It should be understood that the above described means for controlling the operation of the starting and running contactors SC and RC and so governing the successive energization of the primary winding sections in accordance with the electrical condition of the motor secondary winding may be dispensed with and that these contactors may be manually operated or may be operated by speed control means, time delay means or in any other suitable manner. Further, the invention is equally applicable to both synchronous and induction motors. It will be understood that when the invention is applied to induction motors, the secondary winding F may be disregarded and the starting and running contactors will be operated by manually controllable means, speed control means, time operated devices or in any other suitable manner.

Referring now more particularly to the arrangement of the sectionalized primary winding of my improved motor, it is preferred to employ such an arrangement that all of the coils comprising each of the respective separate winding sections have at least one of their corresponding coil sides disposed in separate slots in the primary magnetic structure. Several winding arrangements embodying this relative disposition of the primary winding sections have been shown in detail in Figs. 2 through 9. These figures are developments of the primary magnetic structure of the motor and comprise plan views of the slotted inner surface of the core with the windings thereon. The teeth of the magnetic structures are indicated by the shaded portions 71, and the slots between the teeth by the intervening unshaded portions 72.

The motors illustrated are all of the four-pole three-phase type with four slots per pole per phase and two coil sides in each slot, two primary winding sections being used. It should be understood that the invention, in its broader aspects, embraces the use of the types of windings shown in Figs. 2 through 9 on motors having any desired number of poles, phases, slots per pole per phase and coil sides per slot, and that more than two primary winding sections may be used within the scope of the invention. In order to simplify the disclosure, the windings of one phase only have been shown in full, the end coil sides of the other two phases being indicated. The coil sides may be disposed in the core slots 72 in any desired manner. When two or more coil sides are disposed in each slot, it is customary to place them one above the other in the slot, but in order to clarify the disclosure, the separate coil sides have been shown side-by-side in each slot. For convenience, it may be assumed that the coil sides shown at the left side of each slot are located at the tops of the slots while the coil sides shown at the right of each slot are located at the bottom thereof. The primary winding section represented as A in Fig. 1 has been shown in full lines and the winding section B has been shown in broken lines in Figs. 2 through 9.

Figure 2:
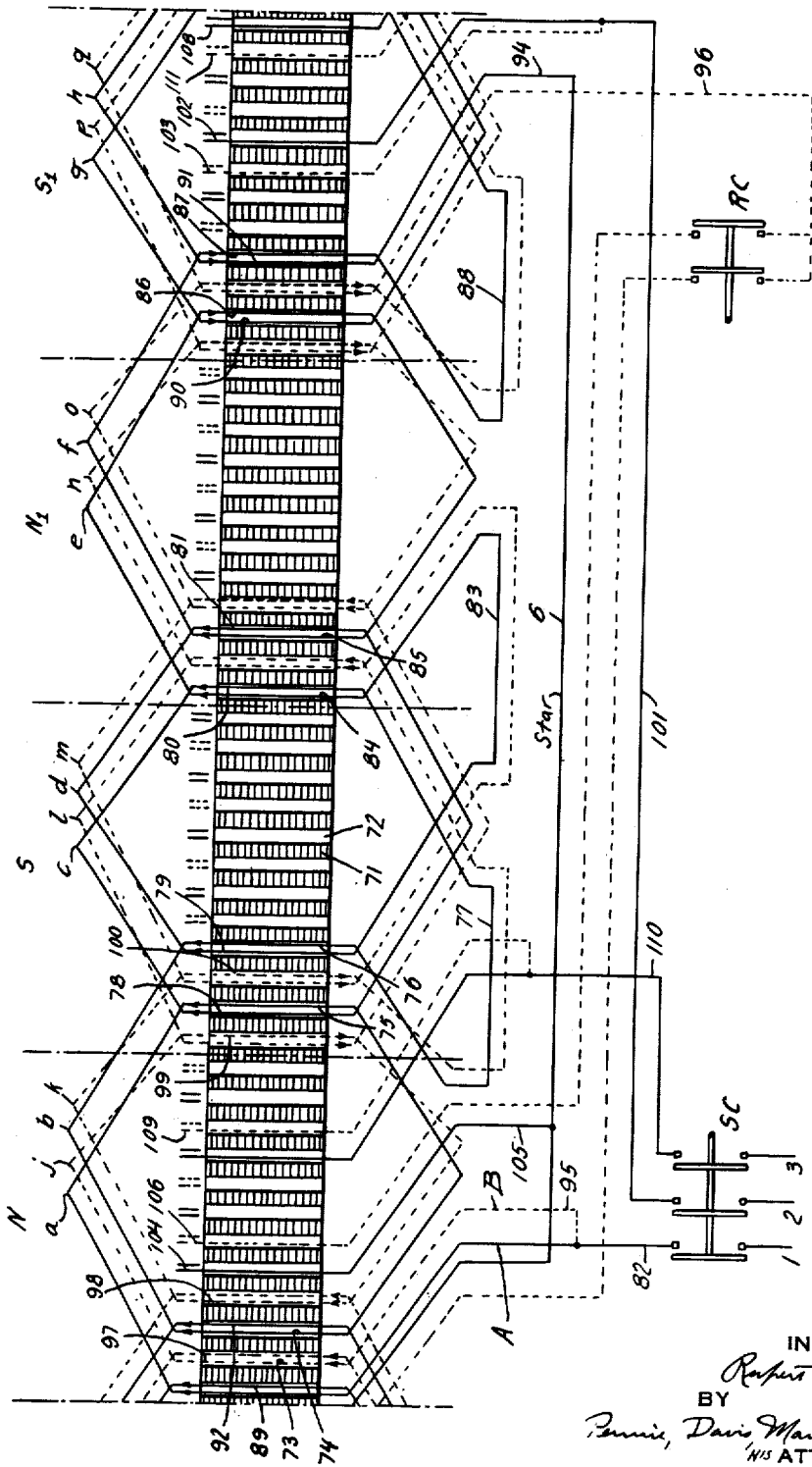
Fig. 2 is a plan view of a development of the primary structure of the motor of Fig. 1 showing one form of primary winding employed in accordance with the present invention.

Referring now more particularly to Fig. 2, it will be seen that the first phase of the winding section A comprises two series connected coils $a$ and $b$ having their left hand coil sides 73 and 74 respectively located in the first and third slots 72 starting from the left of the developed magnetic structure shown, and their right hand coil sides 75 and 76 located in the second and fourth slots 72 starting from the left end of the south pole S of the magnetic structure. The coil $a$ is connected to a terminal 82 which may be connected to the phase wire 1 through the starting contactor SC as explained in connection with Fig. 1. The coil $b$ is connected by the end connection 77 to the first of two series connected coils $c$ and $d$ having their respective left hand coil sides 78 and 79 disposed respectively in the second and fourth slots 72 from the left end of the south pole S and their respective right hand coil sides 80 and 81 disposed respectively in the first and third slots beginning at the left hand end of the north pole $N_1$. From the coil side 79 of the coil $d$, the first primary winding section A extends through the end connection 83 to the coil $e$ of the series connected pair of coils $e$ and $f$. The coils $e$ and $f$ have their respective left hand coil sides 84 and 85 located respectively in the first and third slots of the north pole $N_1$ and their respective right hand coil sides 86 and 87 located in the second and fourth slots from the left of the south pole $S_1$. The first phase of the circuit A is completed by the series connected coils $g$ and $h$. The coil $f$ is connected to the coil $g$ by the end connection 88 running between the right hand coil side 87 of the coil $f$ and the right hand coil side 89 of the coil $g$. It will be seen that the respective left hand coil sides 90 and 91 of the coils $g$ and $h$ are respectively located in the second and fourth slots from the left end of the south pole $S_1$ and that the respective right hand coil sides 89 and 92 of the coils $g$ and $h$ are respectively located in the first and third slots of the north pole N. The end of the coil $h$ is connected to the star point 6 by the wire 94 thus completing the circuit through the section A of the first phase.

From the above description it will be seen that the corresponding coil sides of the winding section A are located in every second slot of the magnetic structure, that is, the left hand coil sides of this section are spaced two slots apart and the right hand coil sides are also spaced two slots apart.

The first phase of the second winding section B comprises the series connected coils $j, k, l, m, n, o, p$ and $q$, the series circuit through which may be readily traced from the drawings. The first coil $j$ of the section B is connected by the lead 95 to the terminal 82 of the winding section A, and the last coil $q$ is connected by the lead 96 to the contacts of the running contactor RC which may be closed to form the neutral point of the winding section B as explained above in connection with Fig. 1. It will be noted that the corresponding coil sides of the winding section B are located in every second slot of the magnetic structure, that is, these coil sides occupy the intervening slots between the slots carrying the corresponding coil sides of the winding section A. Thus, the respective left hand coil sides 97 and 98 of the coils $j$ and $k$ are respectively located in the second and fourth slots from the left of the north pole N and the respective right hand coil sides 99 and 100 of these coils are respectively located in the first and third slots from the left end of the south pole S.

Considering both winding sections A and B, it will be seen that the corresponding coil sides of the coils making up the respective winding sections are respectively located in alternate slots in the magnetic structure. Thus, the left coil side 73 of the coil $a$ in circuit A is located in the first slot of the pole N, the left coil side 97 of the coil $j$ in circuit B is located in the second slot of this pole, the left coil side 74 of the coil $b$ in circuit A is located in the third slot of this pole and the left coil side 98 of the coil $k$ in circuit B is located in the fourth slot of this pole. Similarly, the first slot beginning at the left of the south pole S carries the right coil side 99 of the coil $j$ in circuit B, the second slot carries the right coil side 75 of the coil $a$ in circuit A, the third slot carries the right coil side 100 of the coil $k$ in circuit B and the fourth slot carries the right coil side 76 of the coil $b$ in circuit A.

Figure 3:
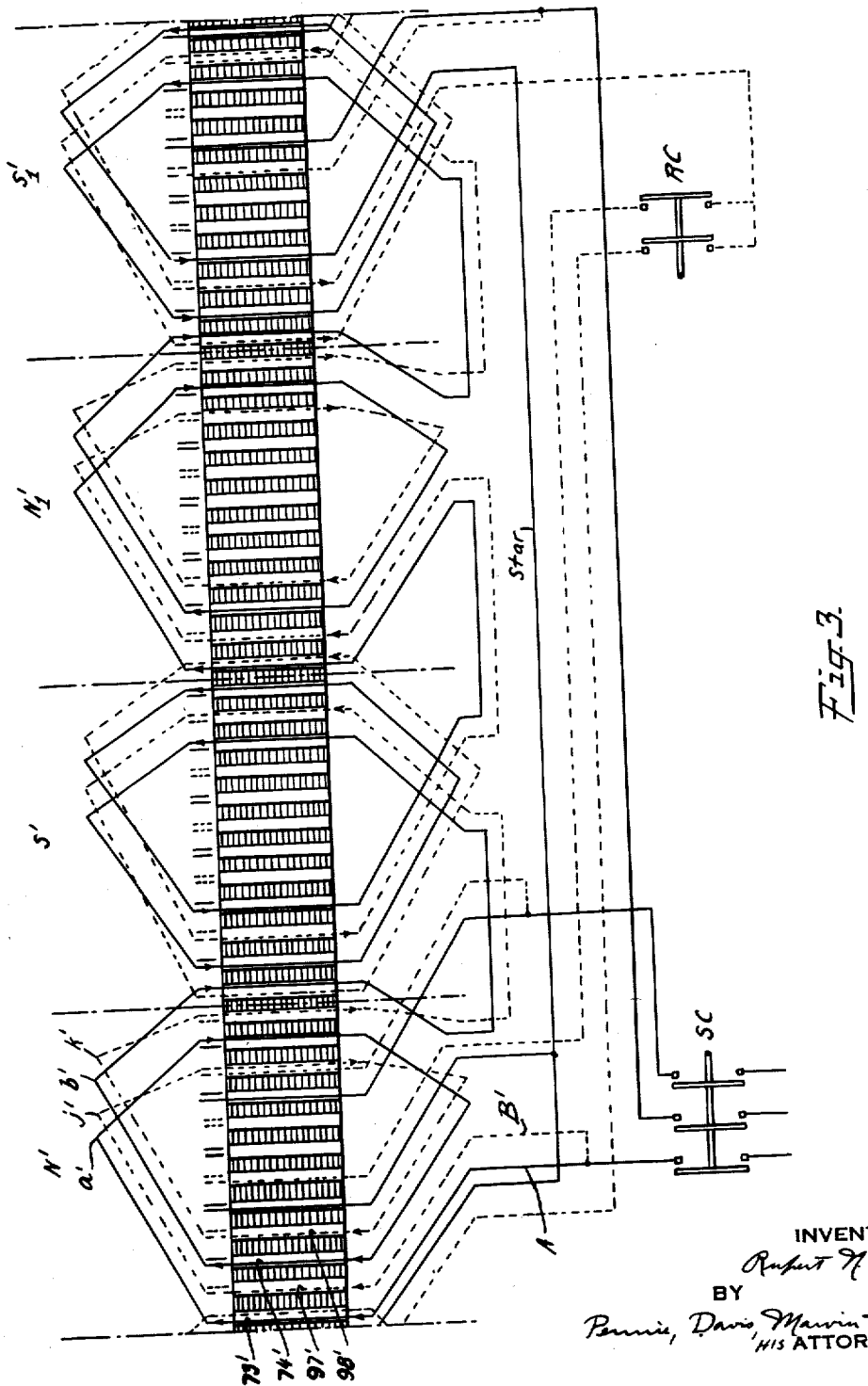
Fig. 3 is a view similar to Fig. 2 showing a fractional pitch winding rather than a full pitch winding.
Figure 4:
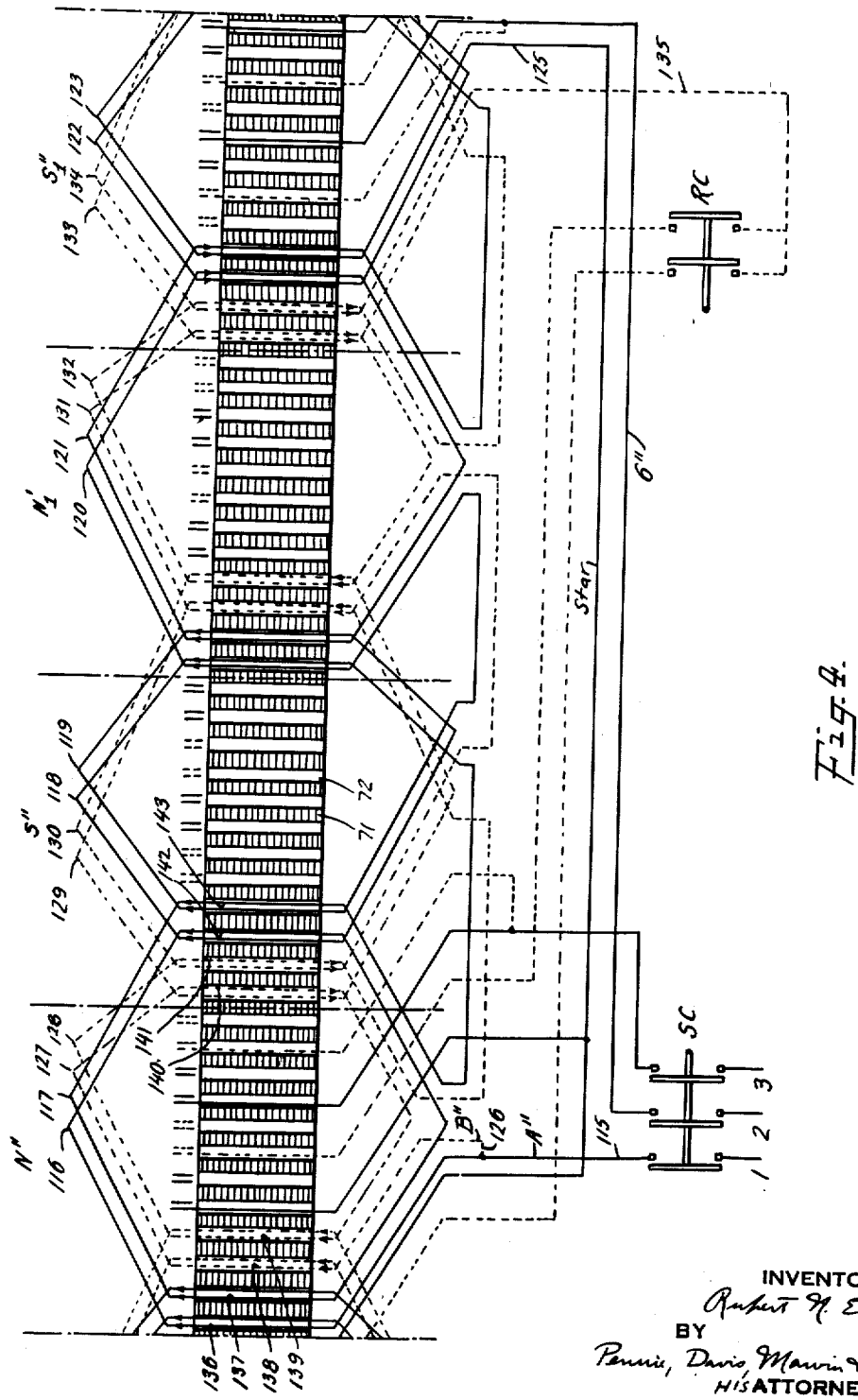
Fig. 4 is a plan view similar to Fig. 2 showing a modified form of full pitch primary winding employed in accordance with the present invention.
Figure 5:
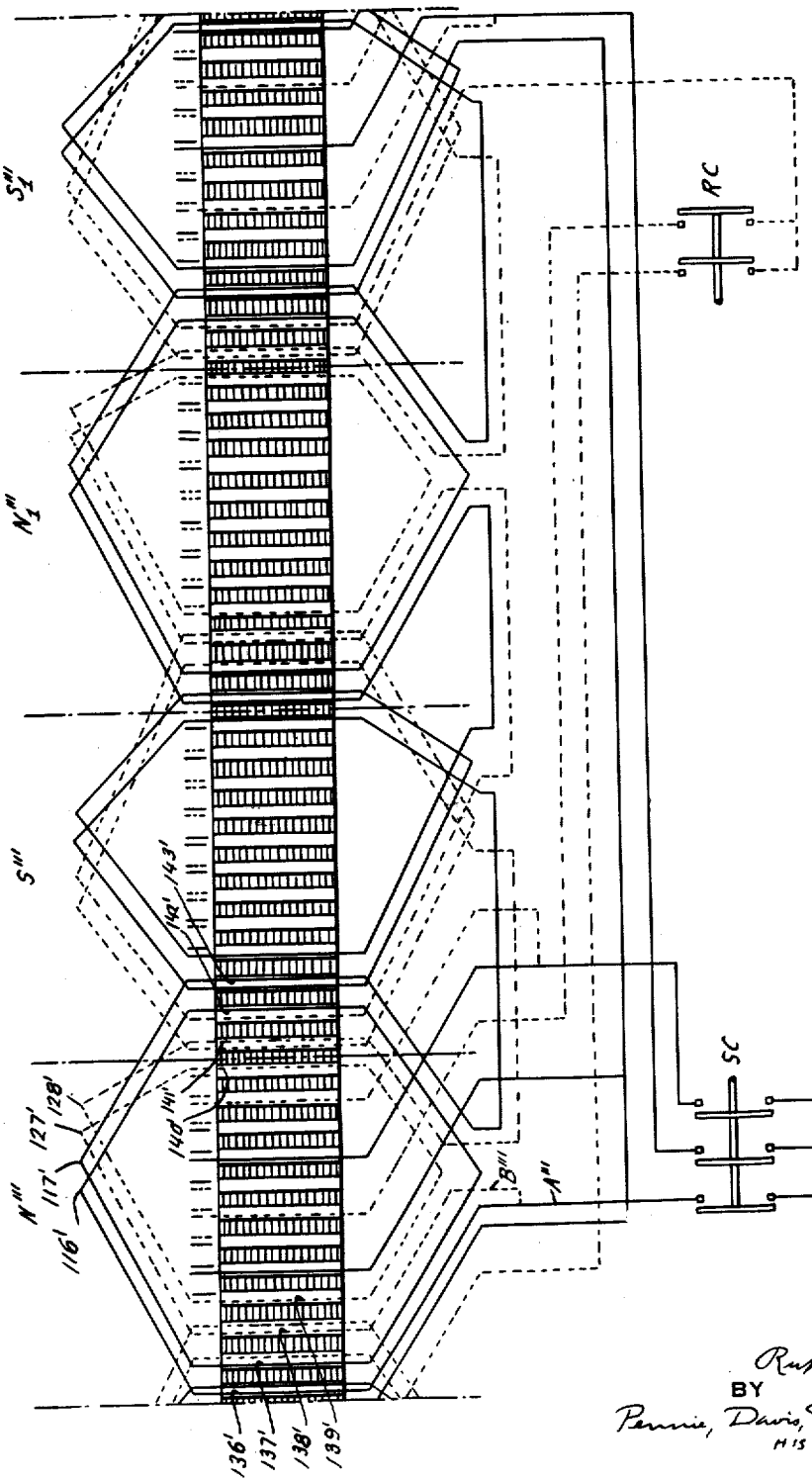
Fig. 5 is a plan view similar to Fig. 4 showing a fractional pitch winding of the type disclosed in Fig. 4.

It should be understood that each of the primary winding coils of both circuits shown in Fig. 2 as well as the corresponding coils shown in Figs. 3, 4 and 5 may comprise any desired number of series connected turns of wire and that these coils have been shown as comprising one wire for the sake of simplicity only.

The end coil sides of each winding section of the second and third phases have been represented to indicate the manner in which the complete winding is arranged. Thus, the phase wire 2 is connected through a contact of the starting contactor SC and a terminal lead 101 to the coil side 102 of the second phase winding of section A and to the coil side 103 of the second phase winding of section B. The second phase of the winding section A terminates at the coil side 104, connected by the end connection 105 to the star or neutral point 6, and the second phase of the winding section B terminates at the coil side 106, connected to the running contactor RC which forms the neutral point of the winding section B when closed. In a like manner, the third phase windings consist of two separate sections, the section A starting at the coil side 107, connected through the terminal 110 and the contactor SC to the phase wire 3, and terminating at the coil side 108 connected to the star or neutral point 6. The section B of the third phase winding starts at the coil side 109 connected to the terminal 110 and terminates at the coil side 111 connected to the contactor RC. The location of the coil sides in the remaining slots has been indicated by the full lines (representing the winding section A) and the broken lines (representing the section B) adjacent the end of each slot.

The location of the corresponding coil sides of the two primary winding sections in alternate slots gives a degree of magnetic coupling between the winding sections which results in a degree of reduction in K V A inrush which is satisfactory for certain installations. This reduction in K V A inrush has been found to average in the neighborhood of 19% on certain machines having alternate slot winding sections, it being understood that the percentage reduction will vary somewhat depending on the number of poles, the pitch of the windings and various other factors of the machines employed.

In the embodiment of the invention shown in Fig. 2, full pitch primary windings are employed, but this embodiment may be employed with fractional pitch windings as well. Thus, in Fig. 3, I have shown a winding arrangement in which the corresponding coil sides of the separate winding sections are respectively disposed in alternate slots and in which fractional pitch windings are used. The windings shown in Fig. 3 are short-corded, that is, reduced in width, by an amount equal to three times the slot pitch. In other words, the opposite coil sides of each primary winding coil shown in Fig. 3 is spaced apart a distance shorter by three slots than the distance between the opposite coil sides of the corresponding full pitch coil of the winding shown in Fig. 2. The effect of this degree of short-cording is equivalent to placing the coil sides of the coils in Fig. 3, 75% of the pole pitch distance apart rather than 100% or the full pole pitch distance apart, as in Fig. 2.

The fractional pitch winding of Fig. 3 may be considered as being derived by keeping one coil side (in this case the left coil side) of each primary coil of the winding shown in Fig. 2 stationary and moving the opposite coil side of each coil three slots toward the stationary coil side. Since the winding arrangement of Fig. 3 differs only in this respect from that shown in Fig. 2 and described in detail above, the circuits of the winding arrangement in Fig. 3 will not be traced. The coils, coil sides, and connections, terminals and poles in Fig. 3 have been designated by the same reference characters, with distinguishing exponents, as those employed to designate the corresponding elements in Fig. 2.

It will be noted that in the arrangement of Fig. 3 as in that of Fig. 2, the corresponding coil sides of the two winding sections are respectively located in alternate slots in the primary magnetic structure. Thus, the first slot beginning at the left of the north pole N' carries the left hand coil side 73' of the coil a' in the winding section A', the second s'ot carries the left hand coil side 97' of the coil j' in the primary winding section B', the third slot carries the left hand coil side 74' of the coil b' in the winding section A' and the fourth slot carries the left hand coil side 98' of the coil k' in the winding section B'. Also, the tenth slot from the left of the pole N' carries the right hand coil side 99' of the coil j' in the winding section B', the eleventh slot carries the right hand coil side 75' of the coil a' in the winding section A', the twelfth slot carries the right hand coil side 100' of the coil k' in the winding section B', and the first slot at the left of the pole S' carries the right hand coil side 76' of the coil b' in the winding section A'. Although the winding arrangement of Fig. 3 has been shown as having coils which are three slots narrower than the corresponding full pitch coils of the winding shown in Fig. 2, it will be readily apparent that various other fractional pitch windings may be employed without departing from the essentials of this embodiment of the invention, that is, the disposition of corresponding coil sides of the winding sections in a ternate slots in the magnetic structure. Thus, the coils may be overcorded, that is, formed with their coil sides farther apart than the full pitch coils shown in Fig. 2 and any desired degree of short-cording or overcording may be used.

According to a further embodiment of the invention, as shown in Figs. 4 and 5, the separate winding sections are so arranged that at least some of the corresponding coil sides of the coils in the separate sections are respectively disposed in separate groups of two or more adjacent slots in the primary winding structure. More specifically, the arrangement shown in these figures by way of illustrating this embodiment of the invention is such that the corresponding coil sides of the coils in the separate winding sections are respectively disposed in alternate successive groups of two adjacent slots.

Referring more in detail to Fig. 4, and considering the first phase of the winding section A", this phase starts at the terminal 115, connected to the starting contactor SC, and comprises the coils 116, 117, 118, 119, 120, 121, 122 and 123, which are connected in series in the order named through circuits which may be readily traced in the drawing. The end coil side 124 of the last coil 123 is connected to the star or neutral point 6" by the end connection 125. The corresponding phase of the other winding section B" starts at the end connection 126 which is connected to the terminal 115, and includes the winding coils 127, 128, 129, 130, 131, 132, 133 and 134, connected in series in the order named, and terminates through the connection 135 at the neutral point formed by the contactor RC when closed.

It will be seen that the winding sections A″ and B″ are so disposed on the magnetic structure that each successive group of two adjacent slots respectively carries the corresponding coil sides of coils in the separate winding sections. Thus, beginning at the left end of the primary magnetic structure shown, the first and second slots respectively carry the left hand coil sides 136 and 137 of the coils 116 and 117 in the primary winding section A″, whereas the third and fourth slots respectively carry the left hand coil sides 138 and 139 of the coils 127 and 128 in the primary winding section B″. Also, beginning at the left end of the south pole S″, the first and second slots respectively carry the right hand coil sides 140 and 141 of the coils 127 and 128 in the primary winding section B″ and the third and fourth slots respectively carry the right hand coil sides 142 and 143 of the coils 116 and 117 in the primary winding section A″. It will be seen that this respective disposition of the corresponding coil sides of the coils in the separate primary winding sections in alternate groups of slots is carried out throughout all coils of all phases of the primary magnetic structure.

The embodiment of the invention shown in Fig. 4, employs full pitch windings, but this alternate groups of slots arrangement may be employed with fractional pitch windings as well. Thus, in Fig. 5, I have shown a winding embodying the alternate groups of slots arrangement of the two winding sections as applied to a motor having fractional pitch windings. The windings shown in Fig. 5 are reduced in width or short-corded by an amount equal to three times the slot pitch, that is, the opposite coil sides of each coil of the winding shown in Fig. 5 are spaced apart a distance shorter by three slots than the distance between the opposite coil sides of the corresponding coil or winding shown in Fig. 4.

The fractional pitch winding of Fig. 5 may be considered as being derived from the full pitch winding of Fig. 4 by moving the right coil side of each coil one slot nearer the left coil side thereof, all of the left coil sides being maintained in the same slots as in Fig. 4. Since the fractional pitch winding arrangement of Fig. 5 differs only in this respect from the full pitch winding shown in Fig. 4, the circuits of the winding arrangement of Fig. 5 will be readily traceable by reference to the above description of Fig. 4. The coils, coil sides, terminals, winding sections and poles of the motor shown in Fig. 5 have been designated by the same reference characters with distinctive exponents as those employed to designate the corresponding elements in Fig. 4. As in the case of Fig. 4, the corresponding coil sides of the separate winding sections shown in Fig. 5 are respectively located in alternate groups of two adjacent slots. Thus, starting at the left end of the developed primary magnetic structure shown in Fig. 5, the first and second slots respectively carry the left hand coil sides 136′ and 137′ of the coils 116′ and 117′ in the primary winding section A‴, whereas, the third and fourth slots respectively carry the left hand coil sides 138′ and 139′ of the coils 127′ and 128′ in the primary winding section B‴. Also, the twelfth and thirteenth slots respectively carry the right hand coil sides 140′ and 141′ of the coils 127′ and 128′ in the primary winding section B‴ and the fourteenth and fifteenth slots respectively carry the right hand coil sides 142′ and 143′ of the coils 116′ and 117′ in the primary winding section A‴. It will be seen that this respective disposition of the corresponding coil sides of the coils in the separate primary winding sections in alternate groups of slots is carried out throughout the primary magnetic structure.

It will be understood that various fractional pitch windings other than the particular winding shown by way of illustration in Fig. 5 may be employed within the scope of the invention. Thus, the coils may be narrower or wider than full pitch coils by any desired amount without altering the above described relative disposition of the corresponding coil sides of the separate winding sections.

It should be noted that in the embodiment of the invention illustrated in Figs. 4 and 5, the separate winding sections are more concentrated, that is, less closely magnetically coupled, than are the winding sections in the embodiment of the invention illustrated in Figs. 3 and 4. Accordingly, in the embodiment of Figs. 4 and 5, the reduction in K V A inrush obtained when one winding section only is connected to the line in starting the motor is appreciably greater than the corresponding reduction obtained with the alternate slot arrangement illustrated in Figs. 2 and 3. Thus, the reduction in K V A inrush at starting with the alternate groups of adjacent slots windings has been found to average in the neighborhood of 22% on machines comparable to those giving an average reduction in the neighborhood of 19% when alternate slot windings are used.

Figure 6:
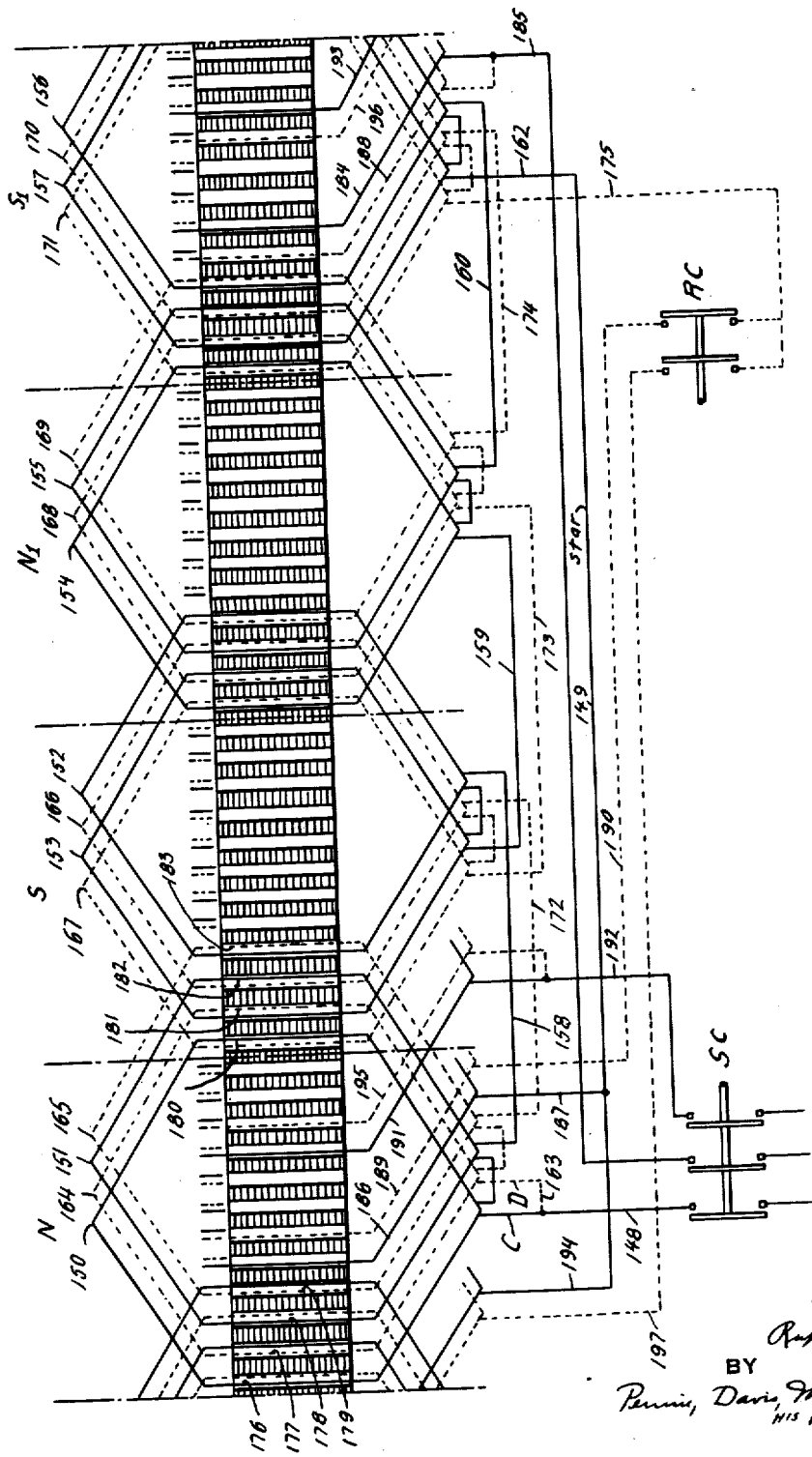
Fig. 6 is a plan view of a developed primary magnetic structure showing a modified form of full pitch windings embodying the invention.
Figure 7:
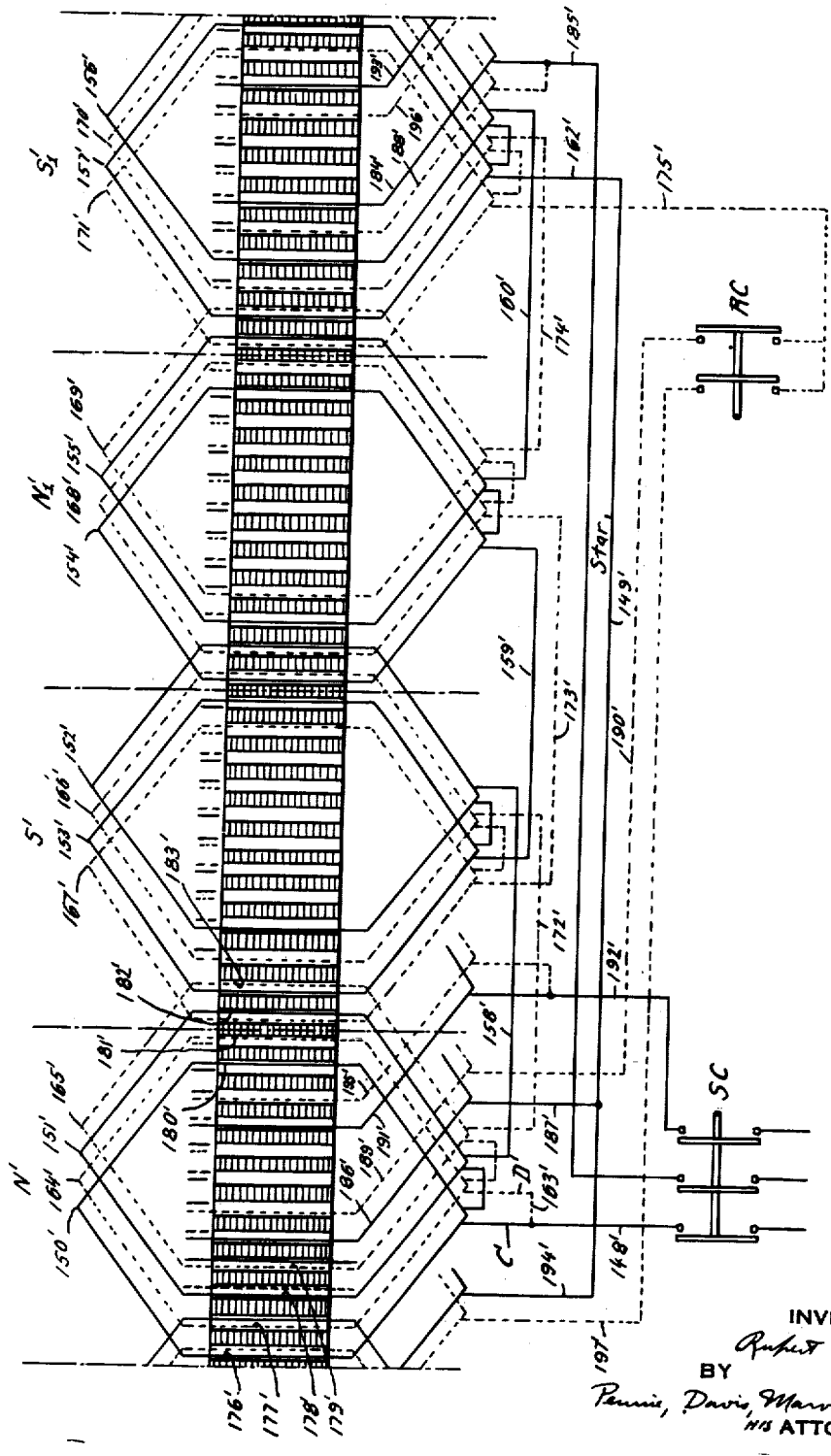
Fig. 7 is a view similar to Fig. 6 showing fractional pitch windings.
Figure 8:
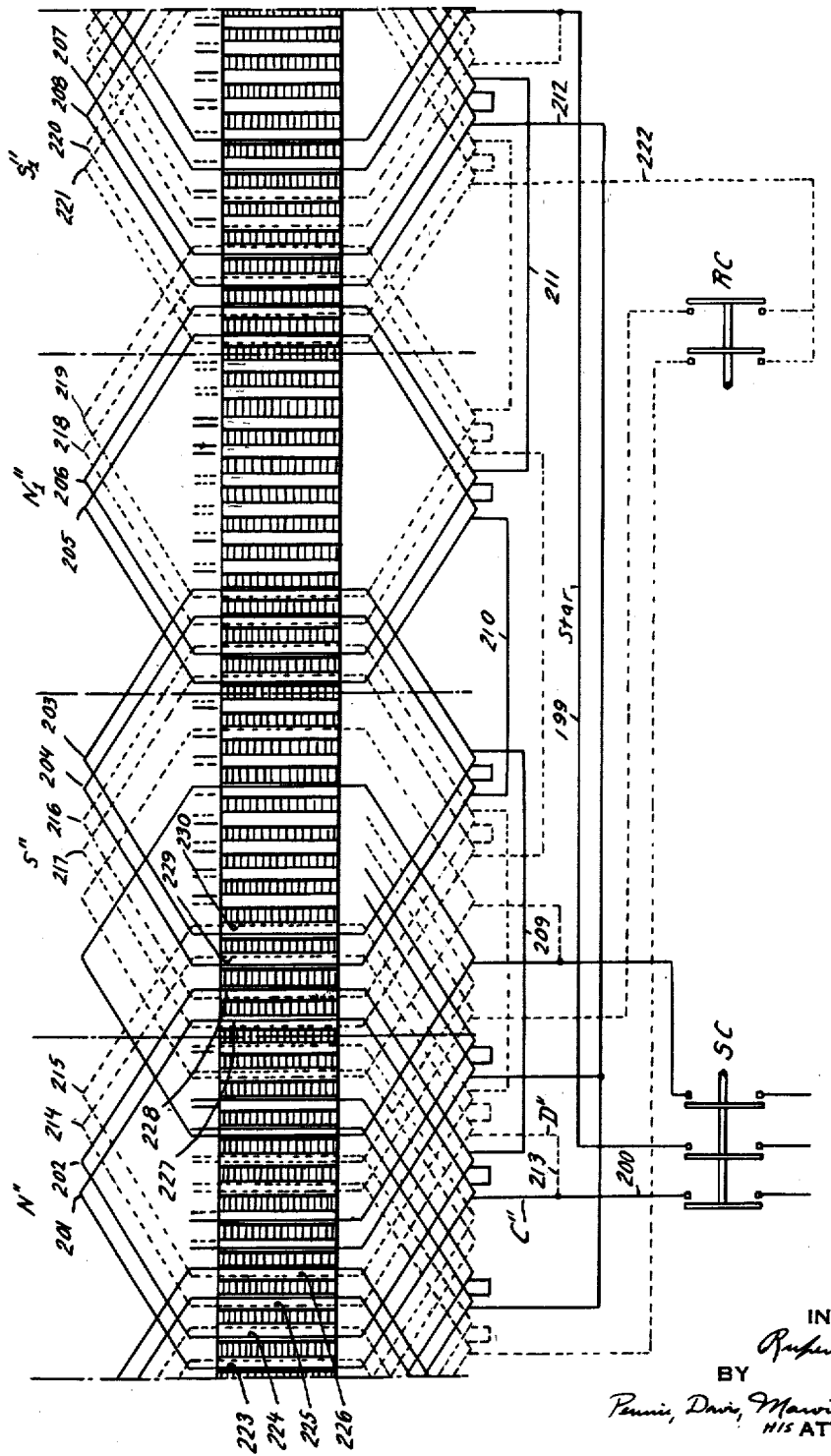
Fig. 8 is a view similar to Fig. 6 showing a modified form of full pitch windings embodying the invention.

It will be noted that in the winding arrangements shown in Figs. 2 through 5, the coils used in forming the primary windings are not all of the same size. Thus, referring to Fig. 2, the opposite coil sides of the coils a, b, e and f in the winding section A and the coils l, m, p and q in the winding section B are thirteen slots apart, whereas, the opposite coil sides of the coils c, d, g and h in the winding section A and the coils j, k, n and o in the winding section B are eleven slots apart. It is usually preferable for manufacturing reasons to employ coils of one size only in a machine, and windings embodying the above described features of the invention may readily be arranged to utilize coils of uniform size in all winding sections. Thus, in Figs. 6 to 9 inclusive, I have shown various winding arrangements embodying my invention, each of which arrangements uses coils of uniform size in all winding sections. Figs. 6 and 7 show windings in which the corresponding coil sides of coils in the separate winding sections are respectively disposed in alternate slots whereas, Figs. 8 and 9 show windings in which the corresponding coil sides of coils in the separate winding sections are respectively disposed in alternate groups of slots.

Referring to Figs. 6 through 9, it will be noted that each of the windings shown comprises a plurality of coils disposed on a magnetic structure. It should be understood that each of the coils shown in these figures may comprise any desired number of turns. Since most windings employ more than one turn per coil, the individual coils are shown closed in the drawings, and in accordance with conventional practice, the terminals or end connections of the coils are shown connected to the coils near the apexes thereof on one side of the magnetic structure. Thus, the circuit through each coil starts at one of the vertical leads shown connected to the coil adjacent its lower apex, passes through the several turns of the coil and terminates at the other of these leads.

In Figs. 6 through 9 the two separate winding sections employed have been designated C and D, these sections corresponding respectively to the winding sections A and B shown in Fig. 1. The winding sections C are shown in full lines, whereas, the winding sections D are shown in broken lines in Figs. 6 through 9.

Referring more particularly to Fig. 6, it will be seen that the first phase of the winding section C starts at the terminal 148 which may be connected through the starting contactor SC to the phase wire 1. This first phase of the winding section C comprises the coils 150, 151, 152, 153, 154, 155, 156 and 157 which are connected in series in the order named through a circuit including the end connections 158, 159 and 160. The last coil 157 is connected to the star or neutral point represented by the wire 149 through the end connection 162. The corresponding phase of the other winding section D starts at the end connection 163 which is connected to the terminal 148, and includes the coils 164, 165, 166, 167, 168, 169, 170 and 171, connected in series in the order named through a circuit including the end connections 172, 173 and 174. The first phase of the winding section D terminates through the end connection 175 at the neutral or star point formed by the contactor RC when closed.

It will be seen that the winding sections C and D in Fig. 6 are so disposed that the corresponding coil sides of the coils in the respective sections are located in alternate slots, that is, the left hand coil sides of the coils in the winding section C are located in every second slot and the left hand coil sides of the coils in the section D are located in the intervening slots. Thus, the first slot starting at the left end of the developed magnetic structure contains the left coil side 176 of the coil 150 in the winding section C, the second slot carries the left hand coil side 177 of the coil 164 in the winding section D, the third slot carries the left hand coil side 178 of the coil 151 in the winding section C and the fourth slot carries the left hand coil side 179 of the coil 165 in the winding section D. Also, the first slot beginning at the left end of the pole S carries the right coil side 180 of the coil 150 in the winding section C, the second slot carries the right coil side 181 of the coil 164 in the winding section D, the third slot carries the right coil side 182 of the coil 151 in the winding section C and the fourth slot carries the right coil side 183 of the coil 165 in the winding section D. Although the remaining two phases have not been shown in full, it will be evident that this respective disposition of the corresponding coil sides of coils in the separate winding sections in alternate slots is carried out throughout the primary structure.

In order to indicate the manner in which the two remaining phases are arranged, the end coils and end connections of both winding sections of these phases have been indicated. Thus, the first coil of the second phase in the winding section C has been indicated at 184 and is connected by the terminal 185 to the starting contactor SC. The second phase of the winding section C terminates at the coil 186 which is connected to the star or neutral point 149 by the end connection 187. The second phase of the winding section D starts at the coil 188 connected to the terminal 185 and terminates at the coil 189 connected by the end connection 190 to the star point contactor RC. The third phase of the winding section C starts at the coil 191 connected to the contactor SC by the terminal 192 and terminates at the coil 193 connected to the star point 149 by the end connection 194. The third phase of the winding section D starts at the coil 195 connected to the terminal 192 and terminates at the coil 196 connected to the star point contactor RC by the end connection 197. The location of the coils in the remaining slots has been indicated by the full lines (representing the winding section C) and broken lines (representing the winding section D) adjacent the ends of the slots.

In the embodiment of the invention shown in Fig. 6, full pitch primary windings are employed, but this alternate coil arrangement may also be used with fractional pitch windings. Thus, in Fig. 7, I have shown a winding embodying the alternate coil arrangement of the winding sections as applied to a motor with fractional pitch windings and coils of uniform size. The windings shown in Fig. 7 are short-corded or reduced in width by an amount equal to two times the slot pitch, that is, the opposite coil sides of the winding coils shown in Fig. 7 are spaced apart a distance shorter by two slots than the distance between the opposite coil sides of the winding coils shown in Fig. 6.

The fractional pitch winding of Fig. 7 may be considered as being derived from the full pitch winding of Fig. 6 by moving the right coil side of each coil two slots nearer to the left coil side thereof, all of the left coil sides being maintained in the same slots as in Fig. 6. Since the fractional pitch winding arrangement of Fig. 7 differs only in this respect from the full pitch winding shown in Fig. 6, the circuits of the winding arrangement of Fig. 7 will be readily traceable by reference to the above description of the circuits of Fig. 6. The coils, coil sides, terminals, poles and winding sections of Fig. 7 have been designated by the same reference characters (with distinctive exponents) as those employed to designate the corresponding elements in Fig. 6.

It will be noted that in the arrangement of Fig. 7, as in that of Fig. 6, the corresponding coil sides of the two winding sections are respectively located in alternate slots in the primary magnetic structure. Thus, the first slot beginning at the left end of the north pole N' carries the left hand coil side 176' of the coil 150' in the winding section C', the second slot carries the left hand coil side 177' of the coil 164' in the winding section D', the third slot carries the left hand coil side 178' of the coil 151' in the winding section C' and the fourth slot carries the left hand coil side 179' of the coil 165' in the winding section D'. Also, the eleventh slot from the left end of the pole N' carries the right coil side 180' of the coil 150' in the winding section C', the twelfth slot carries the right coil side 181' of the coil 164' in the winding section D', the first slot at the left end of the pole S₁ carries the right coil side 182' of the coil 151' in the winding section C', and the second slot from the left end of the pole S' carries the right coil side 183' of the coil 165' in the winding section D'.

Although the winding arrangement of Fig. 7 has been shown as having coils which are two slots narrower than the corresponding coils of the full pitch windings shown in Fig. 6, it will be readily apparent that various other fractional pitch windings may be employed without departing from the essentials of this embodiment of the invention, that is, the disposition of corresponding coil sides of the winding sections in alternate slots of the magnetic structure. Thus, the coils may be narrower or wider than full pitch coils by any desired amount without altering the above described relative disposition of at least one of the corresponding coil sides of each section in alternate slots.

When full pitch windings or fractional pitch windings which are short-corded by an even number of slots are employed, the coil sides of each winding section occupy all slots, as shown in Fig. 6 (full pitch) and in Fig. 7 (short-corded two slots). However, if the windings of this embodiment of the invention are short-corded by an odd number of slots such as one or three slots, then the coil sides of each winding section will occupy every second slot and the coil sides of the other winding section will occupy the intervening slots. Thus, the degree of magnetic coupling between the separate winding sections of the embodiment of the invention illustrated in Figs. 6 and 7 is less and the reactance of one winding section when energized alone is higher when the coils are short-corded by an odd number of slots than is the case when full pitch windings or windings short-corded by an even number of slots are employed. Regardless of whether full pitch windings or windings short-corded by an even or an odd number of slots are used, the corresponding coil sides of the coils in the separate winding sections are located in alternate slots.

Referring to Figs. 8 and 9, the separate winding sections of the windings shown in these figures are so arranged that at least some of the corresponding coil sides of the coils in the separate winding sections are respectively disposed in separate groups of two or more adjacent slots in the primary magnetic structure. More specifically, the arrangement shown in these figures by way of illustrating this embodiment of the invention is such that the corresponding coil sides of the coils in the separate winding sections are respectively disposed in alternate successive groups of two adjacent slots.

Referring more in detail to Fig. 8 and considering the first phase of the winding section C'', this phase starts at the terminal 200 connected to the starting contactor SC and comprises the coils 201, 202, 203, 204, 205, 206, 207 and 208 which are connected in series in the order named through a circuit including the end connections 209, 210 and 211. The last coil 208 is connected to the star or neutral point 199 by the end connection 212. The corresponding phase of the other winding section D'' starts at the end connection 213 and includes the winding coils 214, 215, 216, 217, 218, 219, 220 and 221 connected in series in the order named, and terminates through the end connection 222 at the neutral point formed by the contactor RC when closed.

It will be seen that the winding sections C'' and D'' are so disposed on the magnetic structure that each successive group of two adjacent slots respectively carries the corresponding coil sides of the coils in the separate winding sections. Thus, beginning at the left end of the primary magnetic structure shown, the first and second slots respectively carry the left hand coil sides 223 and 224 of the coils 201 and 202 in the winding section C'', whereas, the third and fourth slots respectively carry the left hand coil sides 225 and 226 of the coils 214 and 215 in the winding section D''. Also, beginning at the left end of the south pole S'', the first and second slots respectively carry the right coil sides 227 and 228 of the coils 201 and 202 in the winding section C'' and the third and fourth slots carry respectively the right coil sides 229 and 230 of the coils 214 and 215 in the winding section D''. It will be seen that this respective disposition of the corresponding coil sides of the coils in the separate primary windings in alternate groups of slots is carried out throughout all coils of the primary magnetic structure.

The embodiment of the invention shown in Fig. 8 employs full pitch windings, but this alternate groups of slots arrangement may be employed with fractional pitch windings as well. Thus, in Fig. 9, I have shown a winding embodying the alternate groups of slots arrangement of the two winding sections as applied to a motor having fractional pitch windings and uniform size coils. The windings shown in Fig. 9 are reduced in width or short-corded by an amount equal to three times the slot pitch, that is, the opposite coil sides of each coil of the windings shown in Fig. 9 are spaced apart a distance shorter by three slots than the distance between the opposite coil sides of the coils in the windings shown in Fig. 8.

The fractional pitch winding of Fig. 9 may be considered as being derived from the full pitch winding of Fig. 8 by moving the right coil side of each coil three slots nearer the left coil side thereof, all of the left coil sides being maintained in the same slots as in Fig. 8. Since the fractional pitch winding arrangement of Fig. 9 differs only in this respect from the full pitch winding shown in Fig. 8, the circuits of the winding arrangement of Fig. 9 will be readily traceable by reference to the above description of Fig. 8. The coils, coil sides, terminals, winding sections and poles of the primary magnetic structure shown in Fig. 9 have been designated by the same reference characters (with distinctive exponents) as those employed to designate the corresponding elements in Fig. 8.

As in the case of Fig. 8, the corresponding coil sides of the coils in the separate winding sections shown in Fig. 9 are respectively located in alternate groups of two adjacent slots. Thus, starting at the left end of the developed primary magnetic structure shown in Fig. 9, the first and second slots respectively carry the left hand coil sides 223' and 224' of the coils 201' and 202' in the winding section C''', whereas, the third and fourth slots respectively carry the left hand coil sides 225' and 226' of the coils 214' and 215' in the primary winding section D'''. Also, the tenth and eleventh slots respectively carry the right hand coil sides 227' and 228' of the coils 201' and 202' in the winding section C''' whereas, the twelfth and thirteenth slots respectively carry the right hand coil sides 229' and 230' of the coils 214' and 215' in the winding section D'''. It will be seen that this respective disposition of the corresponding coil sides of coils in the separate winding sections in alternate groups of slots is carried out throughout the primary magnetic structure.

It will be seen that various fractional pitch windings other than the particular windings shown by way of illustration in Fig. 9 may be employed within the scope of the invention. Thus, the coils may be narrower or wider than the full pitch coils of Fig. 8 by any desired amount without altering the above described relative disposition of the corresponding coil sides of the separate winding sections in alternate groups of slots.

It will be readily understood that the starting operation of the motors shown in Figs. 2 through 9 corresponds to that described above in connection with Fig. 1. Thus, in each case, the starting contactor SC is first closed by suitable means which are preferably manually controllable, thus connecting the first winding section to the line and after the motor speed has reached a value such that it is appropriate to connect the second winding section to the line, the contactor RC is closed by suitable means to effect this connection.

It is to be understood that my invention is not limited to the specific embodiments illustrated and described, but includes such modifications thereof as fall within the scope of the appended claims. For example, while I have shown primary windings each phase of which consists of two winding sections, it is to be understood that each phase may include more than two winding sections. When more than two separate winding sections are used, it will be understood that they may be separately energized successively or two or more sections may be simultaneously energized, depending on the starting characteristics desired.

I claim:

1. The combination of an electric motor comprising a primary magnetic structure having a plurality of slots therein, a polyphase primary winding on said magnetic structure comprising a plurality of winding sections forming at least two similar polyphase circuits with the impedance of one circuit alone greater than that of both circuits in parallel, said circuits respectively comprising coils having at least one of their corresponding coil sides disposed in separate slots in said magnetic structure, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

2. The combination of an electric motor comprising a primary magnetic structure having a plurality of slots therein, a polyphase primary winding on said magnetic structure comprising a plurality of winding sections forming at least two similar polyphase circuits with the impedance of one circuit alone greater than that of both circuits in parallel, said circuits respectively comprising coils having at least one of their corresponding coil sides disposed in alternate slots in said magnetic structure, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

3. The combination of an electric motor comprising a primary magnetic structure having a plurality of slots therein, a polyphase primary winding on said magnetic structure comprising a plurality of winding sections forming at least two similar polyphase circuits with the impedance of one circuit alone greater than that of both circuits in parallel, one of said circuits comprising coils the corresponding coil sides of which are disposed in every second slot and another circuit comprising coils the corresponding coil sides of which are disposed in the intervening slots, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

4. The combination of an electric motor comprising a primary magnetic structure having a plurality of slots therein, a polyphase primary winding on said magnetic structure comprising a plurality of winding sections forming at least two similar polyphase circuits with the impedance of one circuit alone greater than that of both circuits in parallel, said circuits respectively comprising coils having at least one of their corresponding coil sides disposed in separate groups of adjacent slots in said magnetic structure, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

5. The combination of an electric motor comprising a primary magnetic structure having a plurality of slots therein, a polyphase primary winding on said magnetic structure comprising a plurality of winding sections forming at least two similar polyphase circuits with the impedance of one circuit alone greater than that of both circuits in parallel, said circuits respectively comprising coils the corresponding coil sides of which are respectively disposed in groups of equal numbers of adjacent slots in said magnetic structure, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

6. The combination of an electric motor comprising a primary magnetic structure having a plurality of slots therein, a polyphase primary winding on said magnetic structure forming a plurality of magnetic poles and comprising a plurality of winding sections forming at least two similar polyphase circuits with the impedance of one circuit alone greater than that of both circuits in parallel, one of said circuits comprising coils the corresponding coil sides of which are disposed in spaced groups of adjacent slots at all of said poles and another circuit comprising coils the corresponding coil sides of which are disposed in the intervening groups of adjacent slots at all of said poles, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

7. The combination of an electric motor comprising a primary magnetic structure having a plurality of slots therein, a polyphase primary winding on said magnetic structure forming a plurality of magnetic poles and comprising a plurality of winding sections forming at least two similar polyphase circuits with the impedance of one circuit alone greater than that of both circuits in parallel, one of said circuits comprising coils the corresponding coil sides of which are disposed in every second group of equal numbers of adjacent slots at all of said poles and another circuit comprising coils the corresponding coil sides of which are disposed in the intervening groups of adjacent slots at all of said poles, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

8. The combination of an electric motor comprising a primary magnetic structure having a plurality of slots therein, a polyphase primary winding on said magnetic structure forming a plurality of magnetic poles and comprising a plurality of winding sections forming at least two similar polyphase circuits with the impedance of one circuit along greater than that of both circuits in parallel, one of said circuits comprising coils having at least one of their corresponding coil sides disposed in half of the slots of each face of each of said magnetic poles and another circuit comprising coils having at least one of their corresponding coil sides disposed in the remaining slots of each face of each of said magnetic poles, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

In testimony whereof I affix my signature.

RUPERT N. EARLY.

CERTIFICATE OF CORRECTION.

Patent No. 1,901,586.                                                                 March 14, 1933.

RUPERT N. EARLY.

It is hereby certified that error appears in the printed specification of the above numbered patent requiring correction as follows: Page 6, line 92, for "a ternate" read "alternate"; page 12, line 52, claim 8, for "along" read "alone"; and that the said Letters Patent should be read with these corrections therein that the same may conform to the record of the case in the Patent Office.

Signed and sealed this 18th day of April, A. D. 1933.

M. J. Moore.

(Seal)                             Acting Commissioner of Patents.